United States Patent

[11] 3,593,732

[72] Inventor Ernest A. Holscher
 440 St. Katherine Drive, Pasadena, Calif. 91109
[21] Appl. No. 806,461
[22] Filed Mar. 12, 1969
[45] Patented July 20, 1971

[54] TEE JOINT WITH FLOW-DIVERTING VALVE
 9 Claims, 3 Drawing Figs.
[52] U.S. Cl. .................................................. 137/112, 4/187, 137/525.3
[51] Int. Cl. .................................................. F16k 15/00, E03c 1/18
[50] Field of Search ......................................... 4/187, 191, 211, 213; 137/525.3, 112

[56] References Cited
UNITED STATES PATENTS

| | | | |
|---|---|---|---|
| 2,225,840 | 12/1940 | Newton | 137/112 |
| 2,906,281 | 9/1959 | Pillote | 137/525.3 X |
| 3,144,177 | 8/1964 | Cookson | 137/525.3 X |
| 3,240,227 | 3/1966 | Burkholder | 137/525.3 X |
| 3,460,558 | 8/1969 | Johannisson | 137/525.3 X |

Primary Examiner—Laverne D. Geiger
Assistant Examiner—David J. Zobkiw
Attorney—Christie, Parker & Hale ABSTRACT: A tee joint is provided with a flexible elongated tongue that normally covers the transverse arm of the tee joint and is fixed inside the tee joint at a point near the junction of the transverse arm and one of the in-line arms. The flexible tongue is part of a rubber insert having two transverse tabs that are bonded to the interior surface around the perimeter the one in-line arm of the tee joint.

PATENTED JUL 20 1971
3,593,732
FIG 1
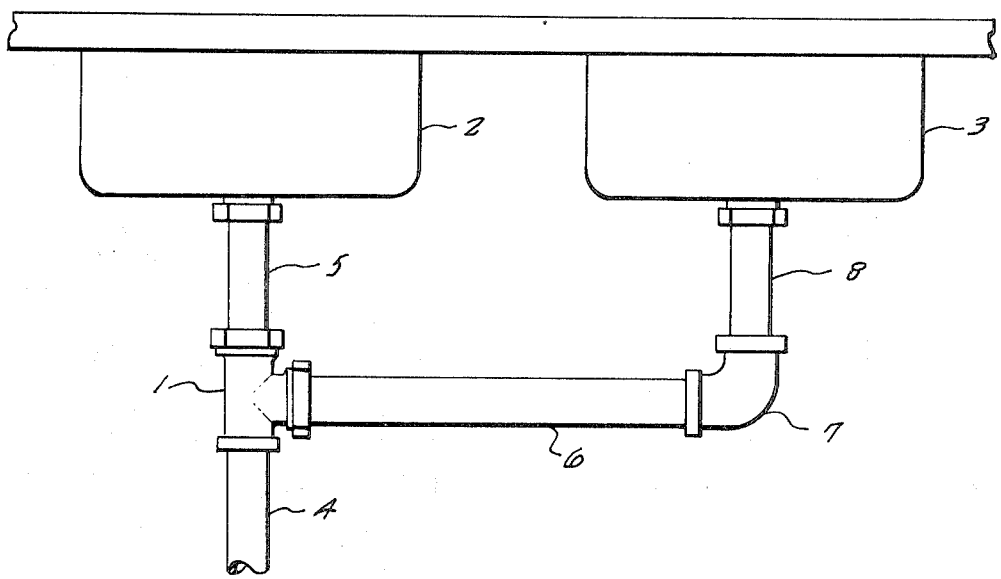
FIG 2
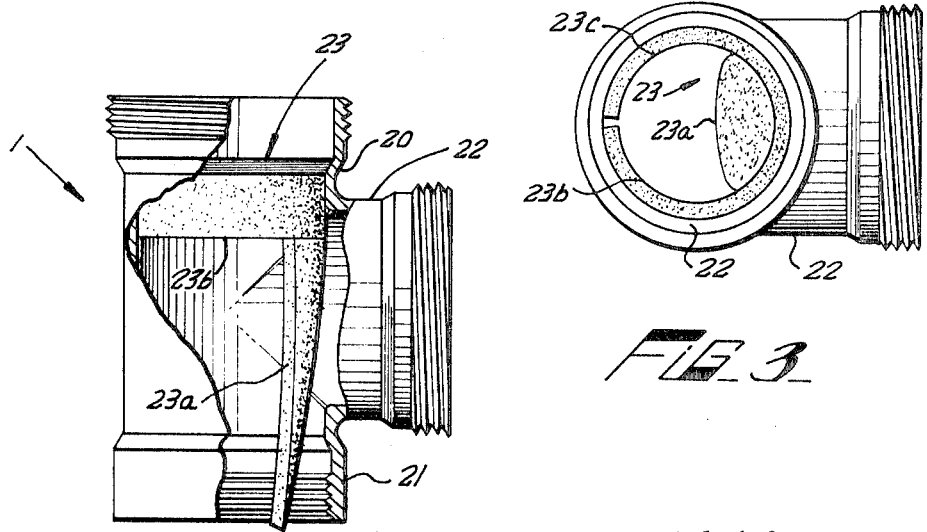
FIG 3
INVENTOR
ERNEST A. HOLSCHER
BY
Christie, Parker & Hale
ATTORNEYS 3,593,732

1

TEE JOINT WITH FLOW-DIVERTING VALVE

BACKGROUND OF THE INVENTION

This invention relates to pipe fittings and, more particularly, to a tee joint that has a simple but effective flow-diverting valve.

It is a known expedient to provide a flow-diverting valve in a tee joint to prevent fluid that is flowing from the upstream in-line arm of the tee joint to the downstream in-line arm from backing up into the transverse arm and to prevent fluid flowing from the transverse arm to the downstream in-line arm from backing up into the upstream in-line arm. A typical flow-diverting valve used for this purpose is disclosed in J. G. Jackson et al. U.S. Pat. No. 3,298,385, issued Jan. 17, 1967. The valve comprises a rigid, circular disc that is hinged to the interior of the tee joint so as to enable it to pivot about a point near the junction of the upstream in-line arm and the transverse arm of the tee joint. Seats are provided for the valve in the upstream in-line arm and in the transverse arm, respectively. When fluid flows from the upstream in-line arm to the downstream in-line arm, it swings the disc against the seat in the transverse arm, thereby preventing the backup of fluid into it. Likewise, when fluid flows from the transverse arm to the downstream in-line arm, it swings the disc against the seat in the upstream in-line arm, thereby preventing the backup of fluid into it. Substantial care must be taken in the fabrication and installation of the seats, the disc, and the hinge structure that supports the disc inside the tee joint. Otherwise, the operation of the valve is not satisfactory because the disc does not seat properly.

SUMMARY OF THE INVENTION

The invention contemplates a flow-diverting valve comprising a flexible elongated tongue that is located inside a tee joint so it normally covers the transverse arm. The flexible tongue is secured to the inside of the tee joint such that it is able to pivot about a point near the junction of the transverse arm and the upstream in-line arm of the tee joint. Thus, when fluid flows from one arm of the tee joint to the other the flexible tongue is urged toward the third arm, thereby sealing it and preventing the backup of fluid. Because the tongue is flexible, it conforms to the opening presented by the arm to be sealed and in so doing covers it effectively without the necessity of valve seats.

Preferably, the tongue is part of a rubber insert of single-piece construction that has two tabs for securing the tongue to the interior of the tee joint. The tabs meet the tongue at one end and extend transverse to its length. When the insert is positioned in the tee joint, the tabs are disposed around the perimeter of the interior surface of the upstream in-line arm and are bonded thereto.

BRIEF DESCRIPTION OF THE DRAWING

The features of a specific embodiment of the best mode contemplated of carrying out the invention are illustrated in the drawing, in which:

FIG. 1 is a side elevation view of a double sink and the pipe fittings that connect the sink to a common drain pipe;

FIG. 2 is a side elevation view of a tee joint with a flow-diverting valve incorporating the principles of the invention; and FIG. 3 is a top plan view of the tee joint of FIG. 2.

DETAILED DESCRIPTION OF THE SPECIFIC EMBODIMENT

In FIG. 1 a tee joint 1 is shown that is connected between sinks 2 and 3 and a drain pipe 4. One in-line arm of tee joint 1 is connected by a nipple 5 to sink 2; the other in-line arm of tee joint 1 is directly connected to drain pipe 4; and the transverse arm of tee joint 1 is connected by a nipple 6, an elbow 7, and a nipple 8 to sink 3.

FIGS. 2 and 3 show the interior of tee joint 1, which has an upstream in-line arm 20, a downstream in-line arm 21, and a transverse arm 22. A rubber insert 23 of single-piece construction is located inside tee joint 1. Insert 23 comprises a flexible elongated tongue 23a, and tabs 23b and 23c that meet tongue 23a at one end so as to extend transverse to its length. Insert 23 could be fabricated in quantity by punching or cutting the design from a flat sheet of rubber stock. Tongue 23a is disposed inside tee joint 1 so it normally covers the opening of transverse arm 22, as illustrated in FIG. 2. In other words, tongue 23a covers the opening of transverse arm 22 when it is not stressed by external force, i.e., the flow of water. Tabs 23b and 23c are bent around the perimeter of the interior surface of in-line arm 20, as illustrated in FIG. 3, and are bonded thereto by a suitable water resistant cement. As illustrated in FIGS. 2 and 3, the bending of tabs 23b and 23c around the perimeter of the interior surface of in-line arm 20 bows tongue 23a to conform to the curvature of in-line arms 20 and 21. Flexible tongue 23a is capable of pivoting about a point near the junction of in-line arm 20 and transverse arm 22 under the influence of fluid flowing from these arms toward in-line arm 21.

When water is drained from sink 2, it flows from in-line arm 20 to in-line arm 21, thereby forcing flexible tongue 23a firmly against the opening of transverse arm 22. Likewise, when water is drained from sink 3 it flows from transverse arm 22 to in-line arm 21, thereby forcing flexible tongue 23a firmly against the opening of in-line arm 20. Because of the flexibility of tongue 23a it conforms to the openings of arms 20 and 22 under the influence of fluid flow so as to create a good seal without the necessity of valve seats. Further, good performance can be achieved without taking great care to maintain close tolerances on the dimensions of insert 23 or in the position of insert 23 inside tee joint 1. Normally, only one sink is drained at a time so tongue 23a is not influenced by fluid flow from arms 20 and 22 simultaneously.

It is to be noted that the selection of the normal position of tongue 23a so it covers the transverse arm rather than either of the in-line arms appreciably simplifies the construction of the flow-diverting valve. For example, if tongue 23a were normally placed so as to cover one of the in-line arms with the tabs bonded to the interior surface of the transverse arm, it can be visualized that great care would have to be exercised to fabricated tongue 23a so it precisely fits the contour of the interior surface of the in-line arms and a valve seat could possibly be necessitated. Furthermore, in such case, to seal the transverse arm, the free end of the flexible tongue would have to be bent completely back to the ends of the tabs, thereby introducing substantial stress into the insert as a whole.

What I claim:

1. A pipe fitting comprising;
   a tee joint having a first in-line arm, a second in-line arm, and a transverse arm; and
   a flexible tongue secured to the inside of the tee joint in the first in-line arm near the junction with the transverse arm such that in the absence of externally applied stresses the tongue covers the opening of the transverse arm, when fluid flows into the tee joint from the transverse arm, the tongue pivots about the point where the tongue is secured to seal the first in-line arm, and when fluid flows into the tee joint from the first in-line arm, the tongue seals the opening of the transverse arm, the flexible tongue being elongated and secured to the inside of the tee joint by a pair of tabs attached to one end of the flexible tongue such that they extend transverse from its length, the tabs being disposed around the perimeter of the interior surface of the first in-line arm.

2. The pipe fitting of claim 1, in which the tabs are bonded to the interior surface of the first in-line arm.

3. The pipe fitting of claim 2, in which the tongue and the tabs are formed from a single piece of flexible material such that the disposition of the tabs around the perimeter of the interior surface of the first in-line arm bows the tongue to conform to the curvature of the in-line arms.

4. The pipe fitting of claim 1, in which the tongue and the tabs are formed from a single piece of flexible material.

5. The combination of claim 4, in which the tongue is bowed to conform to the curvature of the in-line arms.

6. The pipe fitting of claim 1, in which the tongue is bowed to conform to the curvature of the in-line arms.

7. A pipe fitting comprising:
   a tee joint having a first in-line arm, a second in-line arm, and a transverse arm; and
   a flexible tongue secured to the inside of the tee joint such that it normally covers the opening of the transverse arm and is capable of pivoting about a point near the junction of the first in-line arm and the transverse arm, the flexible tongue being elongated and secured to the inside of the tee joint by a pair of tabs attached to one end of the flexible tongue such that they extend transverse from its length, the tabs being disposed around the perimeter of the interior surface of the first in-line arm.

8. The pipe fitting of claim 7, in which the tongue and the tabs are formed from a single piece of flexible material.

9. The pipe fitting of claim 8, in which the tongue is bowed to conform to the curvature of the in-line arms.